Dec. 9, 1958          W. H. NEWELL          2,864,048
PRECISION TORQUE MOTOR
Filed June 9, 1955
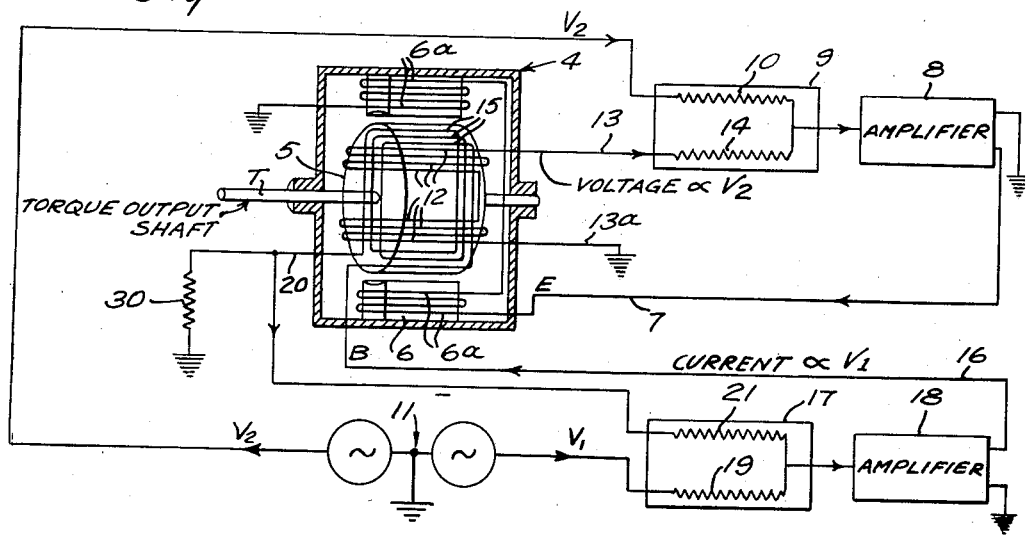
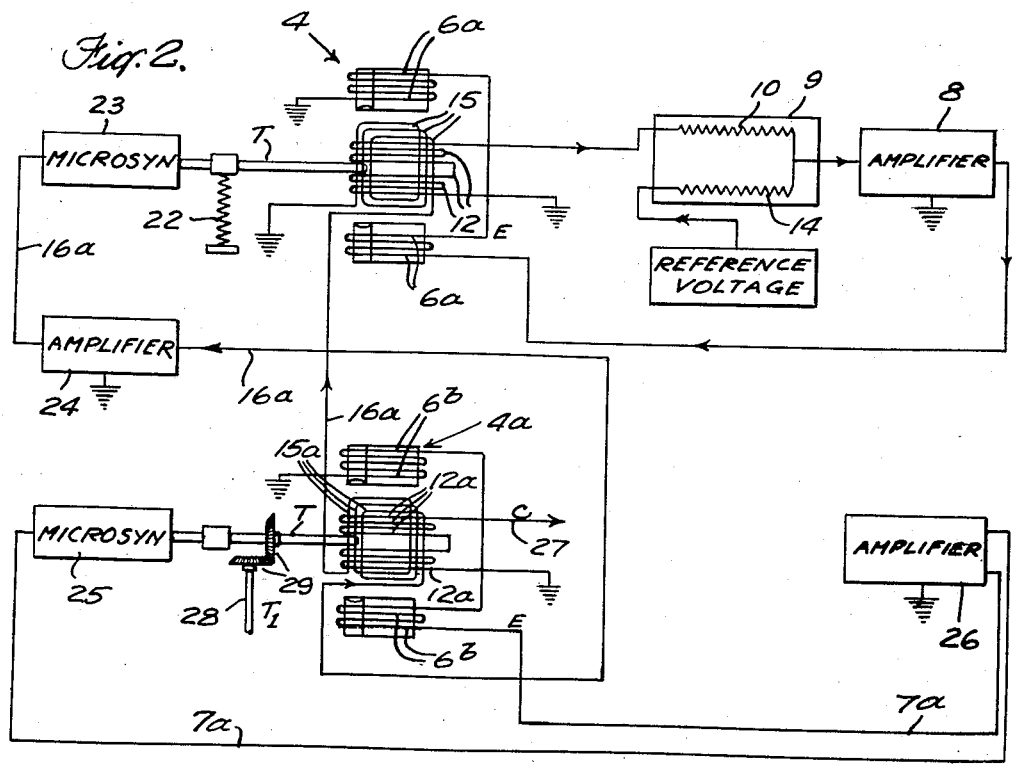
INVENTOR
WILLIAM H. NEWELL
BY
ATTORNEY.

United States Patent Office 2,864,048
Patented Dec. 9, 1958

2,864,048

PRECISION TORQUE MOTOR

William H. Newell, Mount Vernon, N. Y., assignor to Sperry Rand Corporation, Ford Instrument Company Division, Long Island City, N. Y., a corporation of Delaware Application June 9, 1955, Serial No. 514,239

3 Claims. (Cl. 318—436)

This invention relates to a high precision alternating current torque motor which has particular utility in generating accurate gyroscopic precession as well as for use with other instruments requiring regulated drive in torque.

It is generally recognized that motor torque is proportional to the product of rotor current and the field flux in which the current is acting. In many torque motor designs the approximation is made that torque is proportional to the product of the armature and field currents. This approximation, however, ignores the fact that the relationship between field voltage and field flux is not necessarily fixed. Changes in the flux level may occur that are unrelated to the field current. This invention contemplates that any unpredicted change in flux density will be automatically compensated for by means of a feed-back connected to the line, a voltage being induced therein by a special pick-up winding on the rotor which is adapted to detect the change and alter the field current accordingly. There results a constant and predetermined flux density for a given impressed voltage.

Preferably the current in the armature winding is regulated so that any deviation occurring therein, for reasons other than a change in the impressed voltage, will be similarly eliminated. Both the flux and the armature current are thereby made proportional to the voltages the product of which may be said to be proportional to the torque. Because the motor output is proportional to the product of its inputs, the device is adapted for use as a precision multiplier.

Where the reference voltage on which the input voltages are based is likely to vary, the current in the armature winding may be varied by the motor output in such a way as to eliminate the effect of variations in the reference voltage on the generated torque. If this same current is placed in the armature winding of a second motor, the torque placed on its armature will be proportional to the reference voltage, and the voltage induced in its pick-up winding may be used as a measure thereof.

A more complete understanding of a torque motor employing the inventive concept will be had by reading the following detailed description in conjunction with the accompanying drawings, in which Fig. 1 is a schematic showing the precision torque motor; and Fig. 2 is a schematic showing a modified motor for use with a reference voltage which is likely to fluctuate.

Referring to Fig. 1, the numeral 4 indicates a torque unit having a rotor element 5 and a stator 6. Field winding 6a is arranged on the stator and is connected to field circuit 7 the current in which is regulated by amplifier 8. A comparison network 9 is connected to the input side of the amplifier and has a resistor 10 across which a voltage is developed. The voltage $V_2$ is supplied from a reference voltage source 11 which is connected into the field circuit.

A special pick-up winding 12 is wound on the rotor element 5 being connected into the line circuit by means of a negative feed-back lead 13 and grounded by lead 13a. The field induced voltage across resistor 14 which is connected to the lead 13 in the comparison network is compared with the voltage $V_2$ and the field current E in circuit 7 is thereby adjusted to compensate for any unpredicted change in the field flux. Accordingly the flux is constrained to a predicted mathematical relation with the supply voltage $V_2$, due to the elimination by this expedient of changes in the flux density while the voltage $V_2$ is constant.

The current in the armature winding is also subject to fluctuation because of inherent and unpredictable conditions in the winding and the flux in which it is acting, and it may be desirable to make compensation also for such undesired changes. Accordingly rotor winding 15 is energized by rotor circuit 16 in which there is provided a second comparison network 17 and a current regulating amplifier 18 connected to its output. A voltage is developed across resistor 19 in the network, being impressed thereon by reference voltage source 11. A negative feed-back lead 20 having a ground resistor 30 connects the rotor winding 15 to resistor 21 in the network. The current in the rotor winding will be determined by comparison of the drop produced in the resistor 30 as applied to resistor 21 with the portion of the supply voltage $V_1$ applied to resistor 19. Any deviation occurring in the flux in which the rotor current 15 is acting will cause the amplifier 18 to adjust the rotor current and so effect its elimination. The torque output on the rotor shaft is thus made proportional to the product of the impressed voltages and is predictable so long as the voltages are known.

Where the reference voltage is likely to vary, the output shaft of the torque unit 4 in Fig. 2 may be loaded by a constant spring 22 in order to impart a constant torque T to an electrical pick-off, such as a "microsyn" 23, which is placed in rotor circuit 16a, being driven by the shaft to generate a voltage therein. Because the torque is maintained constant, the current in the rotor circuit will change inversely to the change in the reference voltage. As consequence elimination of the effect of variation in the reference voltage is accomplished. A current regulating amplifier 24 is provided in the rotor circuit 16a, being connected to the output of the "microsyn" 23 and the input side of a rotor winding 15a in a second torque unit 4a which has a field winding 6b and a special pick-up winding 12a. An input shaft 28 is operatively connected to the rotor shaft of the second unit through bevel gears 29 on which a torque $T_1$ may be placed for measurement.

The rotor windings of the first and second torque units are in the same circuit 16a and therefore the reference voltage-compensating current in this circuit is placed on the rotor winding of both units. A second "microsyn" 25 is driven by the rotor shaft of unit 4a and the current in field circuit 7a for the second unit including the winding 6b is generated by the "microsyn" 25. An amplifier 26 is provided in the field circuit 7a and is connected between the output of the "microsyn" 25 and the field winding 6b. Because the current in the rotor winding 15a in the torque unit 4a is related to the reference voltage, the torque T is imparted to the rotor shaft of that unit as well as the first unit and the additional torque $T_1$ placed on the rotor shaft of the second unit may be measured in terms of the voltage induced in output lead 27 which is connected to the pick-up winding 12a. If the induced voltage may be represented by the symbol C and the torque placed on the shaft 28 is represented by the symbol $T_1$, then the equation $C=KT_1$ is valid and the voltage C is to the same scale as the reference voltage.

It should be appreciated that the illustrated embodiments are set forth merely to exemplify the principles of invention, the scope of which must be measured by the limitations as recited in the following claims.

What is claimed is:

1. A precision torque motor comprising a torque unit having stator and rotor elements, a pick-up and rotor winding on one of said elements and a field winding on the other of said elements, a source of reference voltage arranged to apply a voltage across said field and rotor windings, said source being connected thereto by means of field and rotor circuits, respectively, a comparison network having a pair of resistive elements, one of said resistive elements being connected to said reference voltage source, a current regulating amplifier disposed in said field circuit and connected to the output of said comparison network, said pick-up winding being connected to the other of said resistive elements in said comparison network as a negative feed-back therefor whereby said comparison network is adapted to compare the voltage produced by said reference voltage source with any voltage induced in said pick-up winding as by virtue of change in field flux so that the field flux will be maintained in proportion to the voltage applied to the field circuit by said voltage source.

2. A precision torque motor comprising a torque unit having a stator and rotor elements, a pick-up and rotor winding on one of said elements and a field winding on the other of said elements, a source of reference voltage arranged to apply a voltage across said field and rotor windings being connected thereto by means of field and rotor circuits, respectively, two comparison networks for comparing induced voltages in said pick-up and rotor windings with the reference voltage, one network having a resistive element connected to receive the output of said reference voltage and a second resistive element connected to said pick-up winding, the other network having a resistive element connected to receive the output of said reference voltage source and a second resistive element connected to said rotor winding, and an amplifier in each circuit connected to the output of the said networks, said pick-up and rotor windings being thereby connected to the field and rotor circuits, respectively, in said comparison networks to provide a negative feed-back therefor whereby the induced voltage in said pick-up winding and the current in said rotor winding will be proportional to the voltages applied to said field and rotor circuits, respectively.

3. A precision torque motor comprising a torque unit having a stator and rotor, a pick-up and rotor winding inductively related to said rotor and a field winding inductively related to said stator, a source of reference voltage arranged to apply a voltage across said field and rotor windings being connected thereto by means of field and rotor circuits, respectively, two comparison networks for comparing induced voltages in said pick-up and rotor windings with the reference voltage, one network having a resistive element connected to receive the output of said reference voltage and a second resistive element connected to said pick-up winding, the other network having a resistive element connected to receive the output of said reference voltage source and a second resistive element connected to said rotor winding, and an amplifier in each circuit connected to the output of the said networks, said pick-up and rotor windings being thereby connected to the field and rotor circuits, respectively, in said comparison networks to provide a negative feed-back therefor whereby the induced voltage in said pick-up winding and the current in said rotor winding will be proportional to the voltages applied to said field and rotor circuits, respectively.

References Cited in the file of this patent

UNITED STATES PATENTS 2,519,356    Curry  ---------------- Aug. 22, 1950